E. H. Ashcroft.
Pressure Gauge.
Nº 9,836.
Patented Jul. 12, 1863.
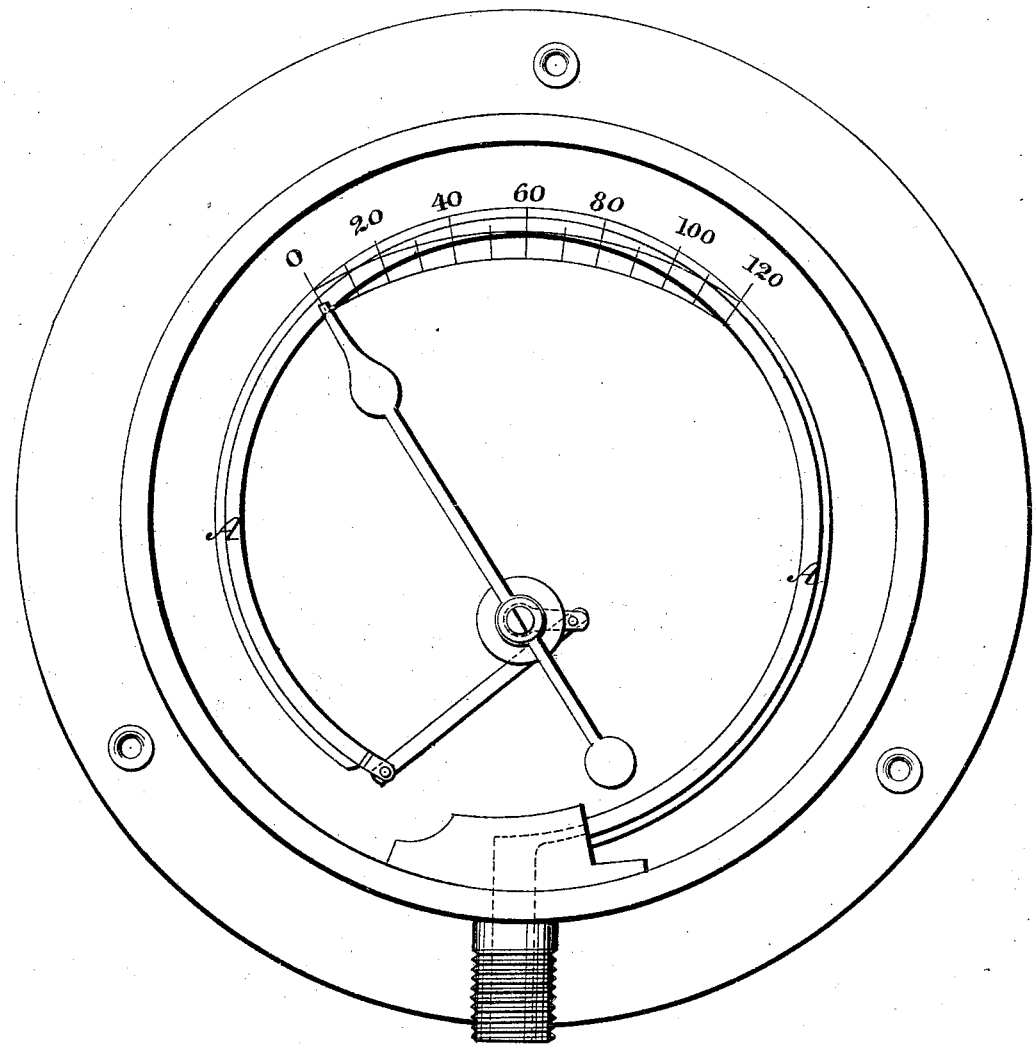

UNITED STATES PATENT OFFICE.

E. H. ASHCROFT, OF BOSTON, MASSACHUSETTS.

PRESSURE-GAGE.

Specification of Letters Patent No. 9,836, dated July 12, 1853.

*To all whom it may concern:*

Be it known that I, EDWARD H. ASHCROFT, of Boston, in the county of Suffolk and State of Massachusetts, have invented certain new and useful Improvements in Pressure-Gages, of which the following is a full, clear, and exact description, my improvements being supplementary and directly applicable to the construction of most of the pressure-gages now known, especially to that invented by M. Bourdon, of Paris, for which Letters Patent of the United States were granted on August 3, 1852, and of which the accompanying drawing is a representation.

The chief feature of M. Bourdon's gage consists of an elastic flattened tube bent in a horse-shoe, spiral or other curved shape, and possesses a certain degree of elasticity. One extremity of this bent tube is fixed in position and connected with a stop-cock by means of which a communication can be opened, between it and the steam or other fluid, whose pressure is to be measured; the other extremity being hermetically sealed, is left free to be moved by any force tending either to straighten or bend the tube. This closed extremity of the tube is connected either directly, or by a link and a toothed sector and pinion to an index pointer, which traverses the arc of a dial plate graduated to given pressures. On communicating the pressure of steam or other fluid through the stop-cock to the interior of the tube, it tends to straighten the latter, causing its free end to move a distance proportioned to the pressure, the amount of which is indicated by the corresponding movement of the index along the graduated arc. When the pressure is withdrawn, the elasticity of the tube, causes it to resume its original position bringing back the index to the point whence it started, when the pressure was applied. If the pressure be applied to the exterior of the tube, the latter will still measure its variation; but in this case its movements will be in an opposite direction to those produced by internal pressure, as increase of pressure will cause it to coil itself up to a smaller diameter, and diminished pressure tend to straighten it. The distance through which the tube will be moved by any given variation of pressure will depend upon its stiffness, the area of its transverse section, its transverse convexity, and the diameter of its convolution. By experiments it has been ascertained, that the movements of the free end of the tube are directly proportional to the degrees of pressure; and equal increments or decrements of pressure correspond to equal degrees of the arc of the dial-plate. And thus elasticity is brought to measure the fluctuations of fluid pressure, and to indicate it to the eye upon a graduated arc, the unit or degree of which is ascertained by trial. A pressure gage on this principle is simple, portable, and adapted to a great variety of applications, and has been extensively brought into use, and would seem to leave nothing further to be desired. But on long trial an imperfection has been developed. It has been found that the elasticity of the flattened tube, gradually becomes impaired, until at length its indications are not sufficiently reliable for even practical purposes.

To remedy this imperfection is the object of my improvements. One of the first requisites, seemed to be a metal or compound that would be little effected, or remain unchanged by the action of air or moisture, and whose elasticity would not be sensibly impaired by constant working under a variable temperature, such as exists in steam boilers, irregularly fired, and when fires are allowed to go out at short intervals; as those of locomotive engines.

By a series of experiments, I have ascertained that when the tube is made of platinum and gold or silver, or gold and silver, the tube remains for all practical purposes unchanged in the particulars mentioned. By this means, the conditions of permanency are satisfied, and the measuring unit of elasticity of the curved tube will continue fixed and invariable. The advantages of this instrument thus protected from derangement, for measuring the pressure of fluids, have only to be known, it is believed, to lead to its general adoption.

The accompanying drawing, whcih makes part of this specification, represents the construction of one of M. Bourdon's pressure gages, supposed to have a transparent dial plate, that the interior mechanism may be seen.

The gage tube (A) of this instrument I prefer to make of an alloy of gold and silver, such as is commonly used for the best quality of gold pens, but I have tried other alloys of the precious metals and have found them to answer as far as tried, and therefore suppose that platinum, gold and silver, or alloys of any two, or all of these may be employed for the construction of these tubes with great advantage, but I would recommend the first named alloy, as I have thoroughly tested it, and demonstrated its advantages.

What I claim as my invention and desire to secure by Letters Patent is—

The method, herein described, of rendering the indications of bent-tube pressure-gages permanent and reliable, by constructing said tubes of precious metal as herein set forth.

In testimony whereof I have hereunto subscribed my name.

EDWARD H. ASHCROFT.

Witnesses:
IASIAH W. HUBBARD,
J. EDWIN IRESON.